Jan. 31, 1956    R. J. RENHOLTS    2,732,613
METHOD OF MAKING A BEARING STRUCTURE
Filed Sept. 16, 1952    2 Sheets-Sheet 1
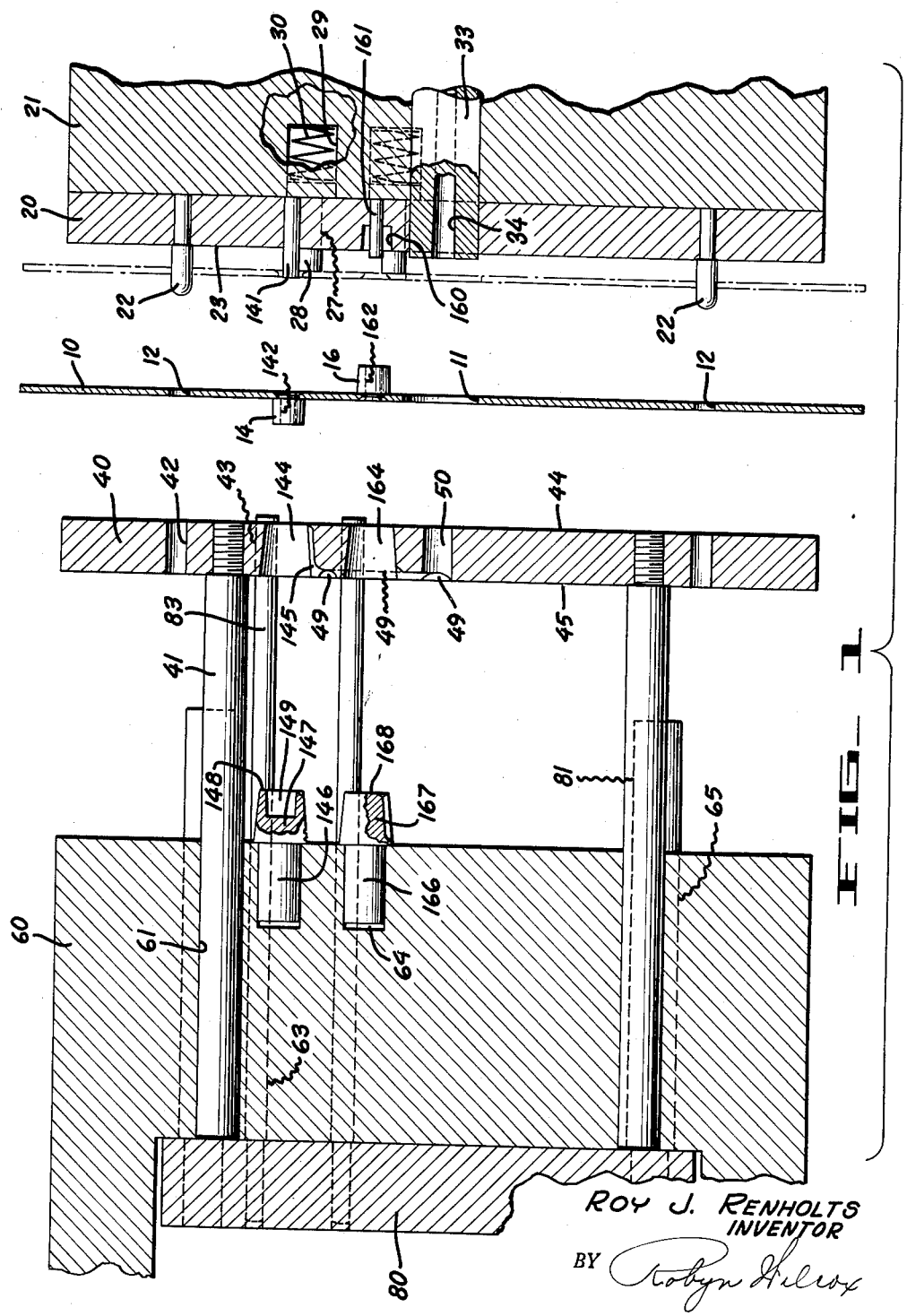
ROY J. RENHOLTS
INVENTOR
BY
ATTORNEY Jan. 31, 1956
R. J. RENHOLTS
2,732,613
METHOD OF MAKING A BEARING STRUCTURE
Filed Sept. 16, 1952
2 Sheets-Sheet 2
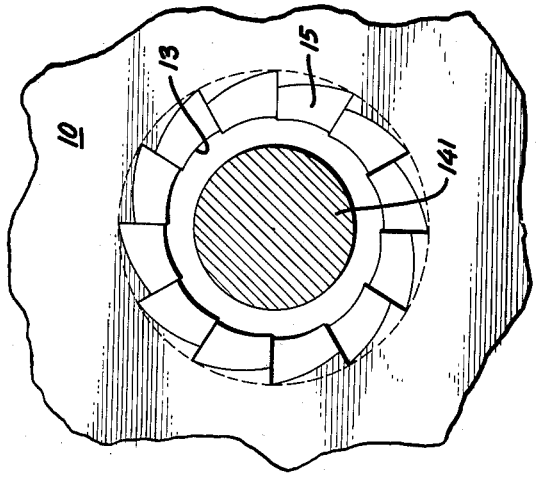
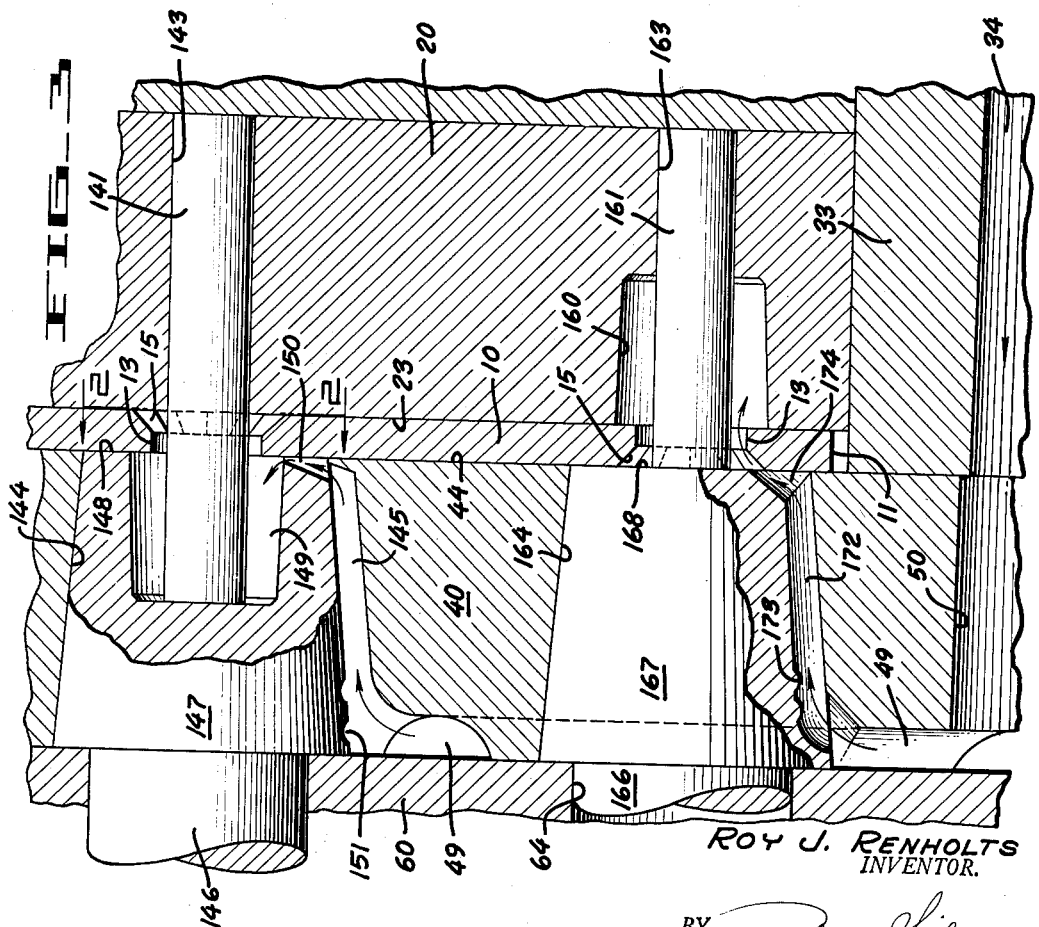
Roy J. Renholts
INVENTOR.
BY
ATTORNEY United States Patent Office 2,732,613
Patented Jan. 31, 1956

2,732,613

METHOD OF MAKING A BEARING STRUCTURE

Roy J. Renholts, Oakland, Calif., assignor to Friden Calculating Machine Co., Inc., a corporation of California Application September 16, 1952, Serial No. 309,870

2 Claims. (Cl. 29—149.5)

This invention relates to bearing structures, and the method of their manufacture, formed of heat and pressure moldable material, such as nylon, or other resinous substances.

My invention relates to a method of making a resinous bearing, such as one formed of nylon or similar materials, formed in situ on the supporting plate. One particular use of my invention is to provide bearings for a calculating machine suitable for rotatingly supporting rock shafts, and the like, which rotate rather slowly. I have found that nylon is eminently fitted for such bearings as, in such usage, it has long life, good bearing qualities, and its use avoids the utilization of critical metal.

Further, such bearings can be more quickly and economically formed than has heretofore been conventional in machines of this kind. Heretofore it has been conventional to punch the supporting plates of such machines, after which the bearing plate usually had to be straightened to remove warping resulting from the punching operation. Metal bushings, such as those formed of bronze or babbitt, or the like, were then inserted in the bearing plate. Normally such bushings either had to be press-fitted into the mating aperture in the frame plate, or slipped into such aperture and then riveted in fixed position therewith. It has usually been necessary in using conventional metal bearings to ream the bearing apertures so as to secure the necessary accurate alignment of the opposed bearings for the various shafts, it being necessary in machines of this type that the shafts, and consequently the bearings in which they are journalled, be accurately aligned.

I have found that nylon bearings, properly molded onto the frame plate, are much more economical to install, as a single operation can place all of the bearing bushings in place on the frame plate, regardless of the direction in which they extend from the frame plate; and such bearings can be held to more accurate alignment, so that reaming is no longer necessary. Further, such bearings give a bearing of good antifriction qualities and long life. My invention relates to such bearings, and the method of forming them, as will be described in detail herein.

Another aspect of my invention is the method of forming an improved antifriction bearing of nylon, or similar materials.

Another aspect of my invention is an improved antifriction bearing formed of nylon, or like materials.

These, and other, objects of my invention will be apparent from the specification and claims which follow. The invention will be readily understood by reference to the attached specification, and to the drawings which form a part thereof, in which:

Fig. 1 is an exploded view of a frame plate showing a pair of nylon bearings lying on opposite sides of the plate, and the die for forming such bearings.

Fig. 2 is an enlarged detail of the aperture in the frame plate for receiving the bearing, being taken along the line 2—2 of Fig. 3.

Fig. 3 is an enlarged detail of the dies with the frame plate clamped therebetween, preliminary to the injection molding of the nylon bearing.

In machines of the type mentioned the frame plates 10 are conventionally stamped out of light metal. In this process suitable aligning apertures 12 are stamped therein, along with a number of irregular windows, or apertures, 11 which are either desirable to lighten the weight of the frame plate or are necessary to provide for operation of parts on both sides of the frame plate. In the single operation of stamping the frame plate it is also conventional to stamp out the necessary bearing apertures 13 (see Fig. 2) which are of substantially circular shape. In the preferred form of my invention the bearing aperture 13 will be provided with a mutilated conical surface 15, such as one formed by countersinking with a "chattering" drill or by punching with a fluted, or mutilated, punch. This conical portion will be arranged in the side of a plate opposite that of the bearing itself, as is shown in Figs. 1 and 3. The frame plate 10 is then placed in a suitable die and the required bearings 14 and 16 are injection molded thereon by a single operation, as will now be described.

The die preferred for the injection molding of the bearings of my invention preferably comprises a number of pieces or sections such as the "hot" die 20, the intermediate mold 40, the backing plate 60 and an operating plate 80. The frame plate 10 is suitably held between the "hot" mold, or die, 20 and the intermediate mold 40 by pins 22 supported on one of the other die members which register with the aligning apertures 12 in the frame plate, and with a registering bore such as 42 in the other die member. In the form shown in Fig. 1 the guide pins 22 are mounted in the "hot" die 20, and when the dies are in their operative position to clamp the frame plate 10, the pin 22 extends into the registering bore 42 in the intermediate mold 40. It will be understood that the guide pins 22 snugly fit within the aligning apertures 12 in order to provide for the accurate location of the frame plate in its exact position required for the proper formation of the bearings 14 and 16.

The "hot" die is preferably securely mounted on a backing plate 21. The "hot" mold 20 is provided with suitable apertures 27 for receiving the shank of a flat-headed pin 28. The backing plate 21 is provided with drilled spring seats 29, axially aligned with the apertures 27, and adapted to receive relatively strong springs 30 compressed between the bottom of the depression 29 and the head of the pin 28. This construction, which utilizes relatively strong springs 30, provides suitable spring pressure for pushing the frame plate 10 away from the "hot" mold 20 at the end of the operation, when the dies are separated and the plate removed. It will be understood that the springs 30 must be relatively strong as considerable force is required to break away the portions of the sprue at the end of the molding operation. It will also be understood that any number of these pressure pins 27 can be used to provide the necessary force for separating the frame plate from the "hot" die and that they can be arranged in any convenient location, preferably adjacent the various bearing apertures 13.

The "hot" die 20 carries core pins 141 for each bearing 14 which lies on the opposite side of the plate 10 from the "hot" die 20. These pins are tightly fitted, as by pressure fitting, into registering holes 143 in the die plate 20 and extend beyond the face 23 thereof a distance exactly equal to the thickness of the plate 10 and the length of the bearing 14. These pins are utilized to form the bore 142 in each bearing 14. The core pins 141 are of course axially aligned with the registering apertures 13 for mounting the particular bearing 14.

The "hot" mold also has formed therein suitable molds 160 for forming the bearings 16 which lie on the adjacent face of the frame plate 10. Axially aligned in each mold 160 is a suitable core pin 161 which extends beyond the face of the "hot" die 20 a distance equal to the thickness of the frame plate 10. These core pins are pressure fitted into registering holes 163 in the die plate 20. Each of these core pins 161 is axially aligned with the registering aperture 13, and is utilized to form the bore 162 in the bearings 16.

The "hot" mold 20 also carries the feed nozzle 33 having an internal bore 34 for the injection of the plastic nylon as hereinafter described. The feed nozzle 33 extends beyond the face of the "hot" mold 20 a distance exactly equal to the thickness of the frame plate 10 and is aligned with one of the irregular apertures 11 thereof.

The intermediate mold 40 lies in opposed relationship to the "hot" mold 20, the frame plate 10 being clamped between these two members. The intermediate mold is mounted upon a plurality of supporting rods 41 which are threaded into the intermediate mold plate 40. The supporting rods 41 slide through apertures 61 in the backing plate 60. The intermediate mold is also provided with a plurality of cylindrical apertures 43 adapted to receive release rods 83. The release rods 83 are threaded into a movable actuating plate 80 lying behind the supporting, or backing, plate 60, which rods extend through suitable apertures 63 in the backing plate 60 and the apertures 43 in the intermediate mold 40. These rods are adapted, when the molds 20 and 40 are at the extremes of their separated positions, to extend through the intermediate mold 40 to force the frame plate 10 away from the face 44 of the intermediate mold.

The intermediate mold is provided with a plurality of truncated conical apertures 144 and 164 extending therethrough, with their small diameters on the face 44 thereof, facing the frame plate 10. In my preferred form, the apertures 144 and 164 are of the same size and general configuration—the former being used for the formation of bearings 14 on the adjacent face of frame plate 10 and the latter for the formation of bearings on the other face of the frame plate 10, adjacent the "hot" mold 20. The axes of the apertures 144 and 164 are axially aligned with the apertures 13 of the frame plate 10, and consequently with the core pins 141 and 161 and the molds 160 of the "hot" mold 20. Each of the apertures 144 or 164 is connected by means of semicircular passage ways 49 with an aperture 50 extending through the intermediate mold 40 and registering with the bore 34 of the injection nozzle 33. These passage ways 49 can be cut into the back face 45 of the intermediate mold as the intermediate mold is tightly held against the backing plate 60 when the mold is in its operative postion to form the nylon bearings on the plate 10. It will be obvious that the bore 34 and main inflow passage 50, and the branch passage ways 49 should be of sufficient size to permit the ready flow of the plastic nylon at the temperatures and pressures used for such molding operation.

It can be noted that in those instances in which the conical apertures 149 serve as a mold for bearings 14, formed on the adjacent side of the plate 10, a small passage way 145 is formed in the wall of the aperture 144, which passage can be smaller than the feed passage 49 and will terminate (as shown particularly in Fig. 3) just short of the face 44 of the intermediate mold. On the other hand, those apertures 160 which serve as a mold for bearings 16, which lie on the opposite side of the plate 10, need no such feed passage, as the feed passage for such bearings will be located in the cores 167 to be next described.

The supporting plate 60 is mounted in the injection molding machine by any suitable means, not shown. This plate is drilled as at 64, to receive the stems 146 and 166 of the conical core blocks 147 and 167, respectively. It will be understood that the stems 146 preferably will be pressure fitted into their registering holes 64, so as to hold the core blocks 147 and 167 rigidly in alignment with the conical apertures 144 and 164, respectively. These core blocks 147 and 167 are of a length to just penetrate the intermediate mold 40 so that the ends 148 and 168, respectively, will lie in the same plane as the face 44 of intermediate mold 40, and firmly against the frame plate 10, when the frame is clamped between the die members. These core blocks 147 and 167 fit snugly within the conical apertures 144 and 164, respectively, so that when the dies are in their operative position, clamping the frame 10 between them, the fluid plastic will be confined to its flow passages 50, 49, and 145 and will not be permitted to flow around the core blocks 147 and 167.

In those instances in which the core block 147 is utilized to form a nylon bearing on the adjacent side of the frame 10, the block is provided with a suitable depression, or mold, 149 for forming the bearing 14. The depth of the depression 149 will be such that when the mold plates are in their operative position shown in Fig. 3, the core pin 141 will firmly abut the base of the depression 149, as shown. The core blocks 147 are provided with a converging passage way 150 which registers with the flow passage 145 formed in the intermediate mold 40. I prefer that this passage be formed in the end of the core block 148 and that the inner end be much smaller than the end which registers with the flow passage 145 so that when the molds are broken the sprue will be broken at the face of the bearing 14.

I also prefer to cut one or two grooves 151 in the periphery of the core block 147 where they will register with the passage way 145 in the intermediate mold 40. These grooves are of course filled with plastic during the injection molding process, and when the parts of the mold are separated they cooperate with the other parts of the mold to hold the sprue in the passageway 145 and therefore cause a break at the small point of the passage 150.

In those instances in which the core blocks 167 are used in connection with bearings 16 lying on the opposite face of the frame 10, the end 168 is in a single plane so as to form a solid abutment in the plane of the face 44 of the intermediate mold, thereby abutting the frame 10 and the core pins 161. A suitable passage way 172 is milled in the periphery of the core block 167, its one end registering with the cooperating feed channel 49 formed in the intermediate mold 40. Preferably this feed channel 172 is formed so that the end adjacent the frame plate 10 is smaller than that registering with the feed channel 49, in order to grip the sprue upon breaking of the mold. Associated with this slight taper in the feed channel I prefer to provide a plurality of ridges 173 which project into the feed channel 172, thereby aiding in the clamping of the sprue. Finally, at the discharge end of the feed channel 172, I provide a sharply tapered orifice section 174 which discharges into the cavity formed in the frame plate 10 by the aperture 13 and countersinking 15, as shown in Fig. 3.

Associated with the backing plate 60 is an operating plate 80. This plate is supported on a plurality of rods 81 threaded into the operating plate 80, and extending through apertures 65 drilled through the supporting plate 60. This operating plate 80 is moved in synchronism with the movement of the "hot" mold 20 and the intermediate mold 40, but in a direction of movement opposite to that of the intermediate mold 40. Thus when the "hot" mold 20 and intermediate mold 40 are moved to clamp the frame plate 10 between them, and the entire assembly abuts against the supporting plate 60, the operating plate 80 is moved to the left so that the release rods 83 do not penetrate the intermediate mold 40. However, when the mold is broken, then the operating plate 80 is moved to the right so as to force the frame plate, and the bearings molded thereon, away from the intermediate mold 40 at the same time the spring-pressed pins 28 force the frame plate away from the "hot" mold 20, thereby breaking the frame plate 10 and its cast bearings away from both molds or dies. In this breaking operation the restricted orifices 150 and 174, respectively, which feed the fluid plastic into the molds for the nylon bearings, and the formation of the feed channels 145 and 172, respectively, and their related grooves 151 and ridges 173 causes the sprue to be broken away from the bearings and to lie in the channels 49 and 50 formed in the intermediate mold 40. The sprue is broken within the feed bore 34 of the nozzle 33 and is readily removed from the intermediate mold by a slight tapping of a hammer, or like instrument, to push it through the intermediate mold toward the left.

It can be mentioned that I prefer to form my plastic bearings of nylon which is heated to a temperature of approximately 500° and to inject the fluid material into the dies at a pressure of between 15 and 20 tons per square inch. At this temperature and pressure the fluid nylon completely fills the channels and molds 149 and 160, respectively, to give perfectly positioned bearings. At this temperature and pressure there is practically no deformity in the bearing after it is withdrawn from the mold, so that bearings have been formed which are long lived, relatively friction free and which are in perfect alignment with the other bearings on the same shaft. These bearings do not have to be reamed, but are ready to receive their shafts as son as the plate is broken out of the mold.

The operation of forming the nylon bearings is believed obvious from the previous description but can be briefly mentioned. The frame plate 10, which has been stamped to form the apertures 11, 12 and 13 and with the apertures 13 either mutilated or counterbored as shown at 15, is placed over the aligning pins 22. The mold is then clamped together to form the assembly shown in Fig. 3 in which the frame plate 10 is clamped between the "hot" mold 20 and the intermediate mold 40 while the latter is held firmly against the supporting plate 60. The nylon, or other plastic, is then injected under the pressures and temperatures above mentioned flowing through the passage way 34, 50, 49 and 145 and 172 into the mold cavities 149 and 160, respectively. The material is then permitted to solidify, after which the mold is broken apart. Upon breaking of the mold the strong springs 30 and their associated pins 28 force the frame plate 10 away from the "hot" mold 20 and the pins 83 force it away from the intermediate mold 40. In this process the sprues are broken away from the molded bearings by the restricted orifices of the converging passage ways 150 and 174, respectively, leaving cleanly molded bearings 14 and 16 on the frame plate 10. A slight tap of the hammer then breaks the sprue away from the intermediate mold 40, and the process can be repeated.

I claim:

1. The method of forming a nylon bearing on a metal supporting plate which comprises perforating said plate to provide an aperture therein, providing a mutilated chamfered surface in one side of said plate in the edge portion surrounding said aperture, positioning said plate between relatively movable dies so that the side opposite the mutilated surface in said plate is adjacent the face of one of said dies and the aperture therein is coaxially aligned with a mold cavity in said die, said mold cavity having an opening larger than said aperture and a coaxial core diametrically smaller than said aperture and of a length sufficient to extend through said aperture, providing the other of said dies with a passageway angularly disposed relative to the face of the die and having a plurality of ridges in the periphery of said passageway, said passageway converging into a reduced orifice opening into the mutilated end of said aperture, clamping said plate between said dies, forcing nylon under pressure through said passageway into said cavity until it completely fills said cavity and said aperture surrounding said core, and separating said dies leaving a bore completely through the bearing and causing the nylon sprue to be severed at the plate surface.

2. The method of forming a plastic journal bearing on each side of a metal supporting plate which comprises perforating said supporting plate to provide a plurality of apertures including a first and second aperture, chamfering one edge portion surrounding said first aperture and the opposite edge portion surrounding said second aperture, mutilating each chamfered edge to form an irregular surface, positioning a die having a cavity therein with its opening larger than and coaxially related to said first aperture for molding a boss on the side of said plate opposite the mutilated surface in said first aperture, positioning a second die for cooperation with said first die and having a cavity therein with its opening larger than and coaxial related to said second aperture for molding a boss on the side of said plate opposite the mutilated surface in said second aperture, mounting pins on said first mentioned die for cooperation with the other of said apertures in said plate to support said plate between said dies and to coaxially align said first and second apertures in said plate with the corresponding cavities in said dies, providing core members in said first mentioned die diametrically smaller than said apertures, one said member for each of said cavities coaxial therewith and extending the depth of the cavity and the thickness of the plate, clamping said plate between the dies, and injecting a plastic material at an elevated temperature and under pressure into and filling such cavities around said core members and into the interstices formed by the respective dies and the chamfered edges in said plate whereby said bosses are secured on said plates and said core members form a passage completely through the associated bosses.

References Cited in the file of this patent

UNITED STATES PATENTS

| | | |
|---|---|---|
| 1,496,886 | Junghans | June 10, 1924 |
| 1,883,906 | Hasselquist | Oct. 25, 1932 |
| 2,255,184 | Osenberg | Sept. 9, 1941 |
| 2,290,249 | Piperoux | July 21, 1942 |
| 2,479,695 | Morin | Aug. 23, 1949 |
| 2,510,091 | Dofsen | June 6, 1950 |
| 2,541,790 | Sugden et al. | Feb. 13, 1951 |
| 2,580,436 | Knoblaugh | Jan. 1, 1952 |
| 2,589,682 | Dudis | Mar. 18, 1952 |
| 2,675,276 | Daugherty | Apr. 13, 1954 |

FOREIGN PATENTS

| | | |
|---|---|---|
| 610,116 | Great Britain | Oct. 12, 1948 |